US006106394A

United States Patent [19]

Furlong

[11] Patent Number: 6,106,394

[45] Date of Patent: Aug. 22, 2000

[54] RANDOM CHARACTER SELECTOR DEVICE

[76] Inventor: Robin Furlong, 58 New Pennywell Rd., St. John's NFLD, Canada, A1B 4B3

[21] Appl. No.: 09/339,184

[22] Filed: Jun. 24, 1999

[51] Int. Cl.[7] .................................................... A63F 13/00

[52] U.S. Cl. .......................... 463/20; 463/22; 273/138.1; 273/139

[58] Field of Search .................. 463/20, 22; 273/142 R, 273/142 JA, 142 JB, 142 JC, 142 JD, 142 A, 142 B, 142 C, 142 D, 138.1, 138.2, 143 A, 143 C, 143 D, 143 E, 143 R

[56] References Cited

U.S. PATENT DOCUMENTS

| | | | |
|---|---|---|---|
| 1,970,731 | 8/1934 | Boggess | 273/143 |
| 1,986,838 | 1/1935 | Manville | 273/142 |
| 2,043,047 | 6/1936 | Lairet | 273/142 |
| 2,095,367 | 10/1937 | Mattson | 273/142 |
| 2,121,494 | 6/1938 | Babcock | 273/143 |
| 2,180,029 | 11/1939 | Babcock | 273/143 |
| 2,429,344 | 10/1947 | Cntron | 273/142 |
| 2,809,041 | 10/1957 | Nackers | 273/143 |
| 2,944,823 | 7/1960 | Gilbert | 273/143 |
| 3,124,359 | 3/1964 | Bottini | 273/145 |
| 3,166,323 | 1/1965 | Anderson | 273/119 |
| 3,347,548 | 10/1967 | Glass et al. | 273/1 |
| 3,471,148 | 10/1969 | Janiszewski et al. | 273/1 |
| 3,512,782 | 5/1970 | Gessin | 273/142 |
| 3,740,039 | 6/1973 | Prola | 273/161 |
| 4,801,145 | 1/1989 | Arevalo | 273/143 |
| 4,875,411 | 10/1989 | Turner | 101/333 |
| 4,886,271 | 12/1989 | Brown | 273/142 |
| 4,984,796 | 1/1981 | Peacock | 273/142 |
| 5,016,881 | 5/1991 | Lindsey | 273/138 A |
| 5,123,648 | 6/1992 | Schmidt | 273/142 |
| 5,125,659 | 6/1992 | Garbee | 273/144 |
| 5,340,105 | 8/1994 | Gostyla | 273/142 R |
| 5,370,393 | 12/1994 | Taylor et al. | 273/142 |
| 5,382,023 | 6/1995 | Roberts et al. | 273/142 |

*Primary Examiner*—Jessica J. Harrison
*Assistant Examiner*—Dolores R. Collins
*Attorney, Agent, or Firm*—Birch, Stewart, Kolasch & Birch, LLP

[57] ABSTRACT

A random selector is provided herein. It includes a housing, e.g., a cylindrical housing in which a portion of the rear curved portion is sliced away to provide a generally-rectangular rear face, or a housing in the form of a globular member in which a portion of an upper end has been sliced away to provide an upper circular face, a portion of a lower end has been sliced away to provide a lower circular face, and in which a portion of the rear race has been sliced off to provide a circular rear face. A spinnable member, e.g., in the form of a spinnable cylinder, is rotatably mounted within the housing and is spinnable about a vertical area of the housing. A plurality of character indicia, e.g., "H" (heads), "T" (tails), is provided in an upper face, e.g., the upper circular face of the spinnable cylinder. A window is provided in the housing. An activation mechanism is operatively associated with the spinnable cylinder. An operator device is operatively associated with the activation mechanism to spin the wheel in a free-wheeling manner. A stopping device is provided for stopping the spinnable cylinder by a friction stop mechanism, e.g., by teeth on the spinnable cylinder. The stopping device includes spring clips which are biassed to the "at rest" position but which are operated automatically alternately to engage and to disengage the teeth to stop the spinner. This then displays one randomly-selected character, e.g. "H" or "T" through the window.

11 Claims, 5 Drawing Sheets

RANDOM CHARACTER SELECTOR DEVICE

BACKGROUND OF THE INVENTION (a) Field of the Invention

This invention relates to a random character selector device. In particular, it relates to a heads-tail coin selection device as a pseudo coin toss device.

(b) Description of the Prior Art

U.S. Pat. No. 1,986,838, patented Jan. 8, 1935, by George D. Manville, provided a random selection device in the form of a machine including a spinnable wheel provided with a full deck of playing cards including the "joker." It included means whereby the wheel could be spun and then be manually stopped at will in an endeavour to register a desired card of the deck at a give index position. The machine included a wheel which rotated freely when activated by a hand crank, which was connected to a spinning mechanism. An automatic brake device was controlled by the crank released the carrier for spinning action and permitted the brake to act, at the player's will, to stop the wheel. A centering device registered a halted card with the index. Means, controlled by the crank, released the brake to permit the centering action.

U.S. Pat. No. 2,043,047, patented Jun. 2, 1936, by Andres Flores Lairet, provided a random display device for randomly selecting one of a plurality of indicia which were located around the perimeter of a rotating disc. The disc was manually activated by a lever having teeth which engaged a gear that was connected to the rotating disc. By engaging the gear with the lever, rotational motion was imparted to the gear and the wheel was rotated.

U.S. Pat. No. 2,095,367, patented Oct. 12, 1937, by Bernard O. Mattson, provided a random selection device in the form of a mechanism in which revolving members cooperating with each other were used to provide a selection by lot or chance. The device had two spinning disc components which were mounted on a common axis of rotation. When one of the discs was rotated, the other disc was urged to follow the spinning motion due to a flexible connection between the two discs. When the discs came to a stopped position, a window on the front disc displayed a number on the rear disc.

U.S. Pat. No. 2,121,494, patented Jun. 21, 1938, by Alfred R. Babcock, provided a nonrepeating indicator, which was adapted for use in connection with games, and sales promotion contests. The device included a frame having a shaft upon which a plurality of independent rotatable member was journalled. Means were provided for simultaneously imparting rotation to the members. Such means included a crank arm which was fixed to the shaft and had a pivotally connected driving arm which was adapted to engage and drive the rotatable members. It also included a manually operable handle which was adapted to turn the shaft.

U.S. Pat. No. 2,180,029, patented Nov. 14, 1939, by Alfred R. Babcock, provided a random selector for a game of chance. The selector device included an oscillatable shaft and a hollow rotor which was journalled on the shaft and was provided with circumferentially disposed characters. A ratchet-wheel and pawl mechanism was provided for imparting rotation to the rotor from the shaft in a forward direction and for restraining it in the opposite direction. A plurality of axially-disposed cross bars divided the inside of the rotor into notches corresponding in number with the teeth in the ratchet-wheel. A weighted aligning member within the rotor was adapted to tumble into any one of the notches when the speed of rotation was slow. The rotor had inwardly-extending barbs to engage the aligning member and to carry it forward and beyond its lowermost position as the rotor stopped its forward rotation, so that the aligning member reversed the direction of rotation of the rotor until it was stopped by the ratchet.

U.S. Pat. No. 2,944,823, patented Jul. 12, 1960, by Normand W. Gilbert, provided a game in the shape of a baseball in a hollow spheroidal shell. A pair of oppositely disposed trunnions projected radially-inwardly from diametrically-opposed portions of the shell, the ends of the oppositely-disposed trunnions being spaced apart. An indicator member consisting of a hollow cylinder having a cylindrical passage extended therethrough into which the trunnions projected. The hollow cylinder was loosely carried on the trunnions for free rotation thereon. The outside cylindrical surface of the hollow cylinder had legends thereon. The shell had a window therein through which the legends may be observed.

U.S. Pat. No. 4,801,145, patented Jan. 31, 1989, by Leonardo J. Arevalo, provided a compact, portable accessory for selecting the numbers to play in a game of chance. The device included a number generator portion comprising a number disc or wheel, with its circumferential edge partitioned into segments, each bearing a different numerical indicia from the field of numbers to be selected for in the lottery. A motor or other drive means was connected to the number wheel so that when the motor was activated by a switch, the number wheel spun or rotated about the motor axis. The number wheel and motor were contained in a housing having a window portion aligned so that only one of the numerical indicia of the number wheel was visible through the window at a time. Thus, when the switch was closed, the number wheel spun beneath the window, and when the switch was subsequently opened, the wheel slowed to a halt to display a single number through the window. Accordingly, by repetitive activation of the switch, a series of more or less random numbers were generated and displayed to the user. The housing formed a relatively small, cylindrical barrel, which was suitable for attachment to a similarly-sized accessory portion, e.g., a writing instrument. Thus a combined number generator/pen can be carried in the user's pocket, and be used both to select the numbers to be played in a lottery, as well as to mark the lottery ticket with those numbers selected.

U.S. Pat. No. 4,875,411, patented Oct. 24, 1989, by L. Turner disclosed a portable, hand-operated mechanical random number selection device that also included a mechanism for marking a lottery sheet for the indicated numbers. The means for generating a substantially-random first pattern, included a cage, cage-biasing means, and a plurality of balls. The cage was moveable between a vertically-extended normal configuration enabling random horizontal movement of the balls within said cage, and a vertically-collapsed printing configuration fixing the balls against horizontal movement within the cage and forcing the balls downwardly. The cage-biasing mans biased the cage to its vertically-extended normal configuration and thereby permitted the balls to assume the first pattern after the cage was randomly shaken.

U.S. Pat. No. 4,886,271, patented Dec. 12, 1989, by Robert L. Brown, provided a game device, e.g., a lottery number selection device, that produced random numbers. That device included an upper disc, a lower disc, and a center planar support, having two aperture holes and a handle. The upper disc and the lower disc had inertia weights affixed thereto for gyration. The upper disc bore a number of protruding pegs that served as a number eliminator. The center support had two viewing ports at a calculated separation on a linear radial from the center axis to align with the opposing numbers group disc. The operation of the device was provided by pure mechanical forces including inertia and hand leverage to provide random numbers in conjunction with a cluster peg disc to conceal given numbers.

U.S. Pat. No. 4,984,796, patented Jan. 15, 1991, by Lawrence L. Peacock, provided a device for selecting random numbers. The device included a wheel having a plurality of rest positions, each rest position having a distinct number associated therewith, the distinct numbers forming the set of numbers which are selectable in the lottery game. A plurality of balls is placed on the wheel, with the number of balls corresponding to the quantity of numbers to be selected to form the subset of numbers forming the entry. The wheel was designed to cause each ball to assume one of the rest positions such that a distinct number was selected for each ball. The entry comprised the subset of numbers which were selected by the plurality of balls.

U.S. Pat. No. 5,123,648, patented Jun. 23, 1992, by Frank A. Schmidt, provided a device for selecting a number, letter or other symbol. The patented device included a body which can be held in the hand of a user and which carried a wheel which was adapted to be manually spun relative to the body to different settings not predeterminable by the user. During the spinning operation, the user could not see the different numbers of other markings, but when the wheel was stopped the view could actuate a viewing member relative to the body and wheel to a position exposing the selected marking. The viewing member preferably served a dual function of exposing one of the markings to view and at the same time locking the wheel against rotation from that particular setting. The viewing member may be spring urged to one of its two positions and be manually actuable to the other position. Desirably, the spring yieldingly urged the member to a position in which the wheel was free for rotation and the numbers were out of view. It was manually actuable to a position locking the wheel against rotation and exposing the particular selected number to view. The wheel may have peripheral teeth projecting beyond the body and which are adapted to be engaged by a user's hand to spin the wheel, with those same teeth being engageable by the viewing member to lock the wheel against rotation.

U.S. Pat. No. 5,125,659, patented Jun. 30, 1992, by Leon Garbee, disclosed a portable, mechanically-operated random number selection device which included a revolving drum, a plurality of number-containing disks placed inside the drum, and a slot on the drum for permitting the number-containing disks to exit from the drum in a random manner.

U.S. Pat. No. 5,382,023, patented Jan. 17, 1995, by John W. Roberts, et al, provided a random number generator structure which included a plurality of wheels to generate a like plurality of numbers. The wheels were arranged within a tubular housing and were rotatably mounted within the housing and were arranged for spinning within the housing for viewing of individual numbers through an individual window which was associated with each respective wheel. In one embodiment, the user wound the disc about an axis, and a helical spring imparted rotational motion to the disc. In another embodiment, a series of gears was activated by a motor which was controlled by a switch.

U.S. Pat. No. 5,370,393, patented Dec. 6, 1994, by James A. Taylor, et al, provided a random number selection apparatus including a base and an axle projecting perpendicularly from a center portion of the base. A random-number-containing wheel was supported by the axle, was juxtaposed next to the base, and was rotatable on the axle. The wheel contained a plurality of selectable numbers and a plurality of selectable wells associated with the selectable numbers. A selector wheel assembly was supported by the axle, was juxtaposed to the random-number-containing wheel, and was rotatable on the axle. It included a well-selector portion and a first number-viewing window. The well-selector portion was adapted to be manually randomly positioned in registration with a randomly chosen selectable well on the random-number-containing wheel. The first number-viewing window was adapted to be positioned in registration with a randomly chosen selectable number on the random-number-containing wheel that was associated with the chosen well. A retainer assembly was supported by brackets which were connected to the base and was juxtaposed next to the selector wheel assembly, to retain the selector wheel assembly and the random-number-containing wheel on the axle. It included a second number-viewing window which was adapted to be placed in registration with the first number-viewing window for viewing a randomly chosen selectable number. A manually-held selector assembly was capable of cooperating with the well-selector portion of the selector wheel assembly for randomly choosing a selectable well on the random-number-containing wheel.

SUMMARY OF THE INVENTION (a) Aims of the Invention

None of the above devices provided a simple, manually-activated, random character selector which was suitable for the purpose of a pseudo coin toss.

Accordingly, it is an object of this invention to provide a machine of simple construction which is reliable in its action and which cannot be manipulated to make an unfair or cheating selection.

It is another object of this invention to provide a mechanism which is simple in structure, economical of manufacture, durable, compact, highly efficient in use and silent in operation.

Another object of this invention is to provide a device which cannot be tampered with by the operator and will provide an equal chance for any of the individual characters to appear in a window of the casing after each operation.

It is yet another object of this invention to provide a random character selector which may be easily and efficiently manufactured and marketed.

It is still another object of this invention to provide a random character selector which is of durable and reliable construction.

(b) Statements of Invention

The present invention provides a random character selector comprising a housing, a window in the housing, a spinnable cylinder which is mounted within the housing, and which is spinnable about a vertical axis of the housing, a plurality of character indicia on an upper circular face of the spinnable cylinder, an activation mechanism which is operatively associated with the spinnable cylinder, operator means which is operatively associated with the activation mechanism to spin the spinnable cylinder in a free-wheeling manner and means for stopping the spinnable cylinder by means of a friction stop mechanism, thereby to display a single randomly-selected character through the window of the housing.

The present invention also provides a random character selector comprising: a cylindrical housing from which a portion of the rear curved face has been slices away to provide a generally-rectangular rear face, a window in the cylindrical housing, a spinnable cylinder which is mounted within the housing and which is mounted for spinning about the longitudinal axis of the cylindrical housing, a plurality of character indicia on an upper circular face of the spinnable cylinder, an activation mechanism which is operatively associated with the spinnable cylinder, operator means which is operatively-associated with the activation mechanism to spin the spinnable cylinder in a free-wheeling manner and means for stopping the spinnable cylinder by means of a friction stop mechanism to display a single randomly-selected character through the window of the housing.

The present invention still further provides a random character selector comprising: a housing in the form of a globular member in which a portion of an upper end has been sliced away to provide an upper circular face, a lower end has been sliced away to provide a lower circular face, and in which a portion of the rear face has been sliced off to provide a circular rear face, a window in the upper face of the housing, a spinnable cylinder which is mounted for spinning about an axis which is perpendicular to the plane of the equator of the globular housing, the spinnable cylinder including a plurality of stop members, the stop members being disposed around the circumference of the spinnable cylinder, a plurality of character indicia on the upper face of the spinnable cylinder, an activation mechanism which is operatively associated with the spinnable cylinder, operator means which protrudes from the lower face of the globular housing for operating the activation mechanism to spin the spinnable cylinder in a free-wheeling manner, stopping means which are mounted within the globular housing for selective engagement with the stop members to stop the spinnable cylinder, the stopping means being spring biassed to the "at-rest" position and being operated automatically, and alternately to engage and to disengage the stop members to stop the spinning of the spinnable cylinder thereby to display a randomly-selected character through the window of the housing.

(c) Other Features of the Invention

By one feature of this invention, the plurality of character indicia is in the form of alternating "heads" indicia and "tails" indicia, thereby to display a randomly-selected "heads" indicia or "tails" indicia character through the window of the housing.

By another feature of this invention and of the above feature, the stop members comprise four vertically-extended teeth on the spinnable cylinder, and the stopping means comprises a pawl which is springingly mounted or a mounting plate which is secured to the circular rear face.

By other features of this invention and of the above features, the spinnable cylinder is mounted on a central longitudinal shaft, and the operator means comprises a manually-operated spinner wheel which is directly connected to the central longitudinal shaft; or is a small electric motor, the output shaft of which is directly connected to the central longitudinal shaft.

By other features of this invention and of the above features, the random character selector includes a back plate enclosing the circular rear face.

Figure 1:
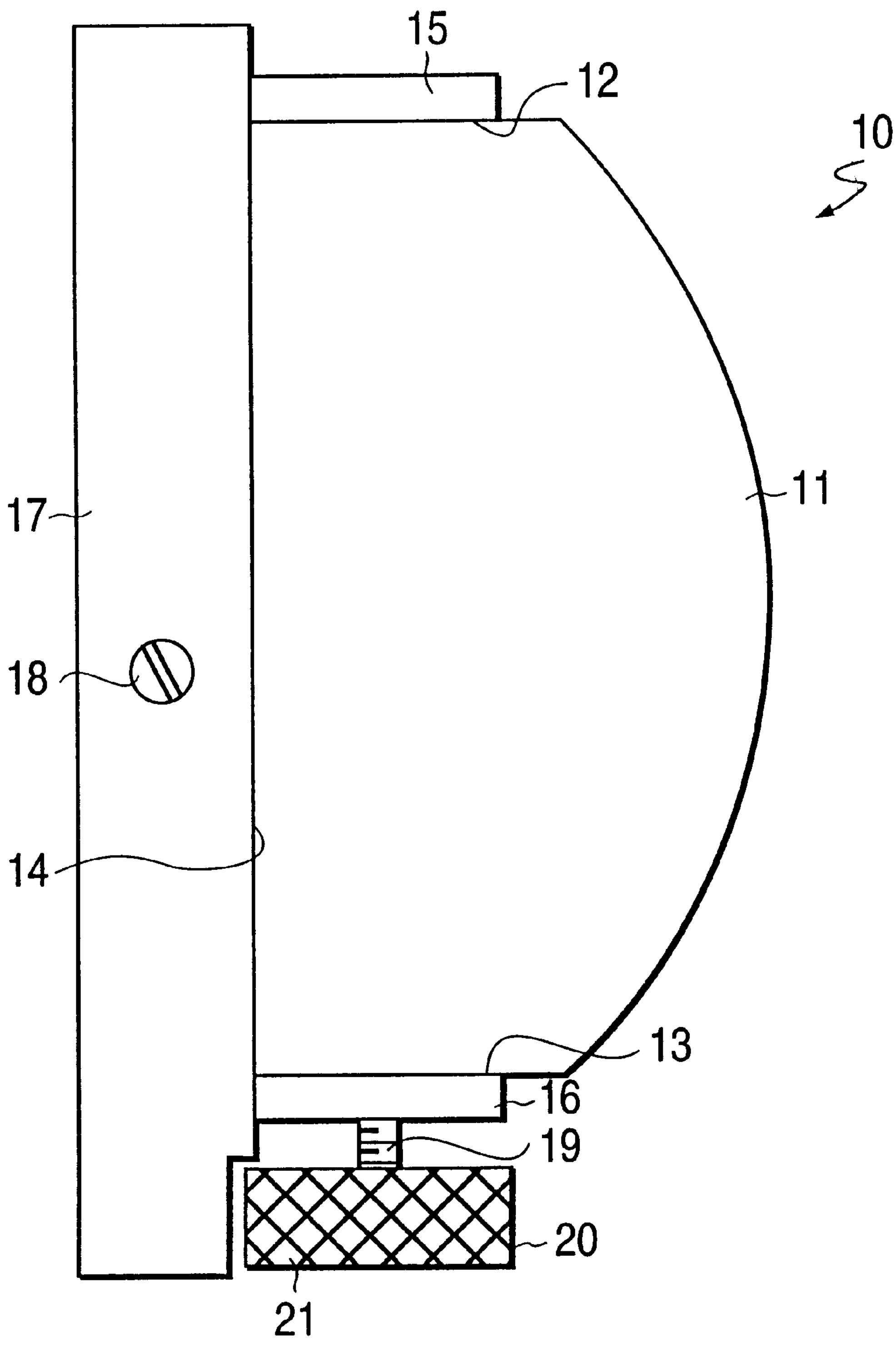
FIG. 1 is a side elevational view of the random character selector of one embodiment of this invention.

DESCRIPTION OF PREFERRED EMBODIMENTS (a) Description of FIG. 1

As seen in FIG. 1, the random character selector is a housing 10 which preferably takes the form of a globular member, e.g., a billiard ball 11, in which a portion of the top has been sliced off to form a circular, top face 12, in which a portion of the bottom has been sliced off to form a bottom face 13, and in which a portion of the rear has been sliced off to form a rear circular face 14. The top face 12 is fitted with a view cover 15, the bottom face 13 is fitted with a bearing sheath 16, and the rear face 14 is fitted with a back plate 17, which is secured to the globular member 11 by means of two screws, one of which 18 being shown.

Projecting below bearing sheath 16 is a central longitudinal shaft 19 of a spinnable cylinder, to be described in greater detail with respect to FIG. 2. A spinning dial 20 having a knurled gripping surface 21 is threadedly secured to the shaft 19, although other equivalent securing means may be used.

Figure 2:
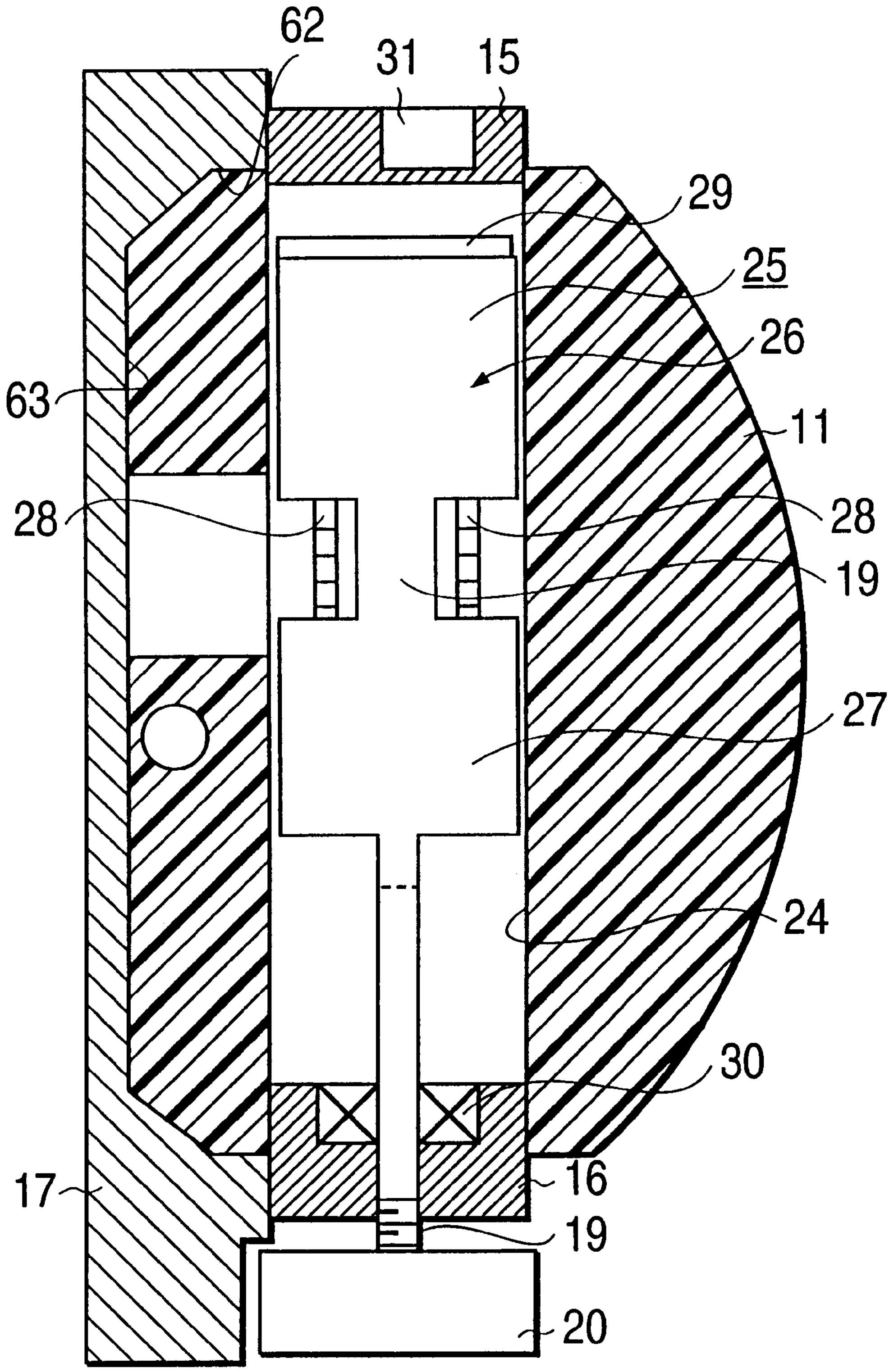
FIG. 2 is a central longitudinal cross-section of the embodiment of the invention shown in FIG. 1.

(b) Description of FIG. 2

As seen in FIG. 2, the random character selector 25 is provided in a vertical bore 24 of the housing 11 and includes an upper spinnable cylinder 26 and a lower flywheel cylinder 27 which is interconnected to the upper spinnable cylinder 26 by means of shaft 19. In addition a plurality (e.g. 4) vertical rods 28 extend between the lower face of upper spinnable cylinder 26 and the upper face of lower flywheel cylinder 27 to serve as stop members or teeth, for a purpose to be described hereinafter. Supported atop the top face of upper spinnable cylinder 26 and secured thereto is a random character disc 29, e.g., one which includes a plurality of "heads" or "H" symbols alternately with a plurality of "tails" or "T" symbols.

The bearing sheath 16 supports a bearing 30 therein through which shaft 19 passes for rotation therein.

The view cover 15 is provided with a circular viewing window 31.

Figure 3:
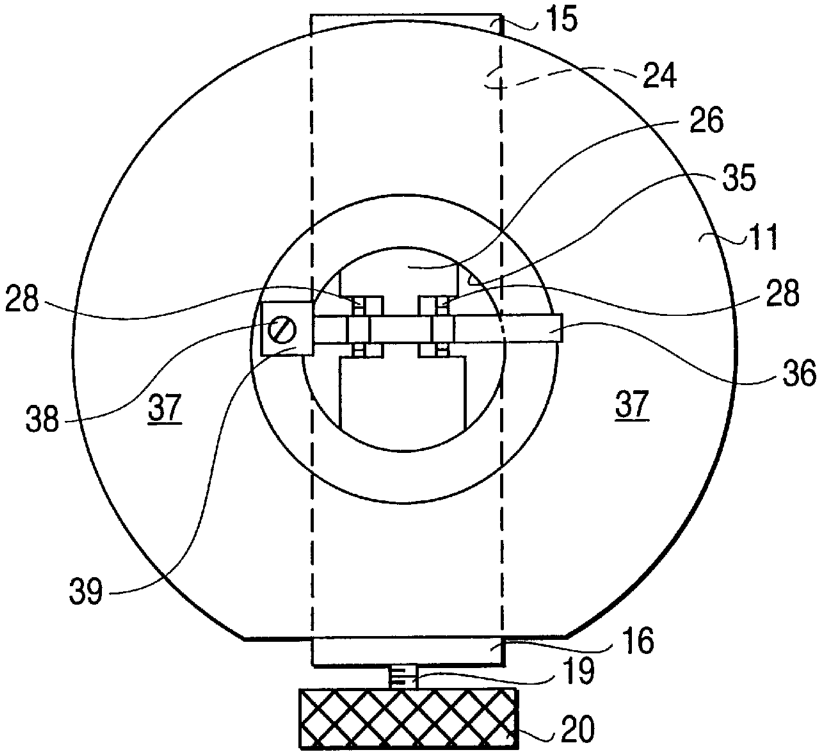
FIG. 3 is a rear elevational view of the embodiment of the invention shown in FIG. 1, with the back plate removed.

(c) Description of FIG. 3

As seen in FIG. 3, a second transverse bore 35 is provided which intersects bore 24. A multiple bent spring clip 36 is secured to the circular end faces 37 of the globular member 11 by means of screw 38 on mounting piece 39. The bent portions of spring clip are adapted alternately frictionally to engage the vertical rods 28 so that such bent spring acts as a pawl to the rods 28 which act as teeth.

Figure 4:
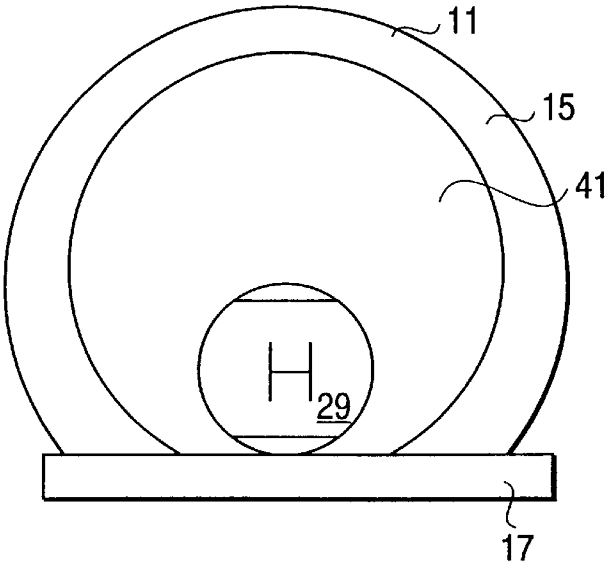
FIG. 4 is a top elevational view of the embodiment of the invention shown in FIG. 1.

(d) Description of FIG. 4

As seen in FIG. 4, the view cover 15 is provided with a circular window 41 below which is seen the character disc 29, upon which is seen the letter "H".

Figure 5:
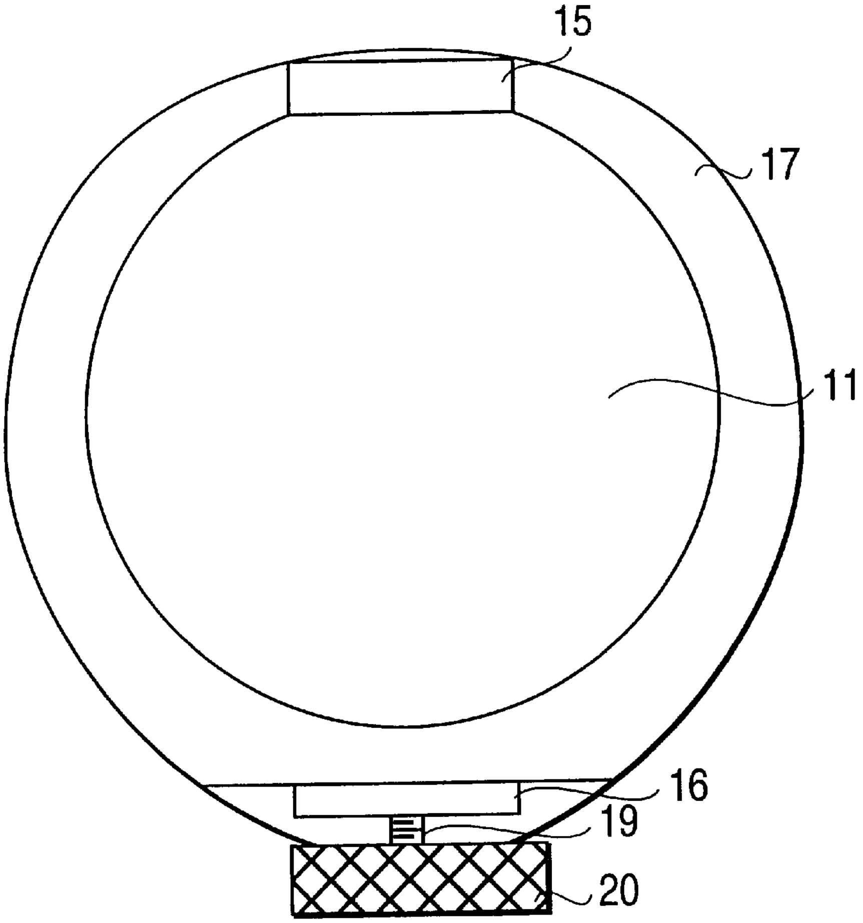
FIG. 5 is view of the embodiment of the invention shown in FIG. 1 as viewed from the front.

(e) Description of FIG. 5

FIG. 5 shows the relative orientation of the globular member 11, the back plate 17, the view cover 15, the bearing sheath 16, the shaft 19 and the knurled spinning dial 20.

Figure 6:
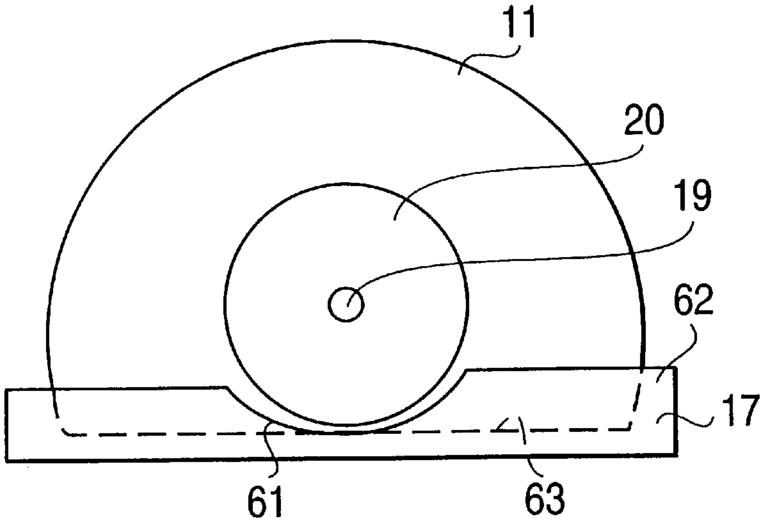
FIG. 6 is a view of the embodiment of the invention as viewed from the side.

(f) Description of FIG. 6

FIG. 6 shows the relative orientation of the globular member 11, the back plate 17, the knurled spinning dial 20 and the shaft 19. It will be noted that one side edge of the back plate 17 is provided with an actuate recess 61 to permit the knurled spinning dial 20 to be able to be spun. In addition, the back plate 17 is provided with a cylindrical wall 62 providing a circular valley 63 within the central area thereof.

Figure 7:
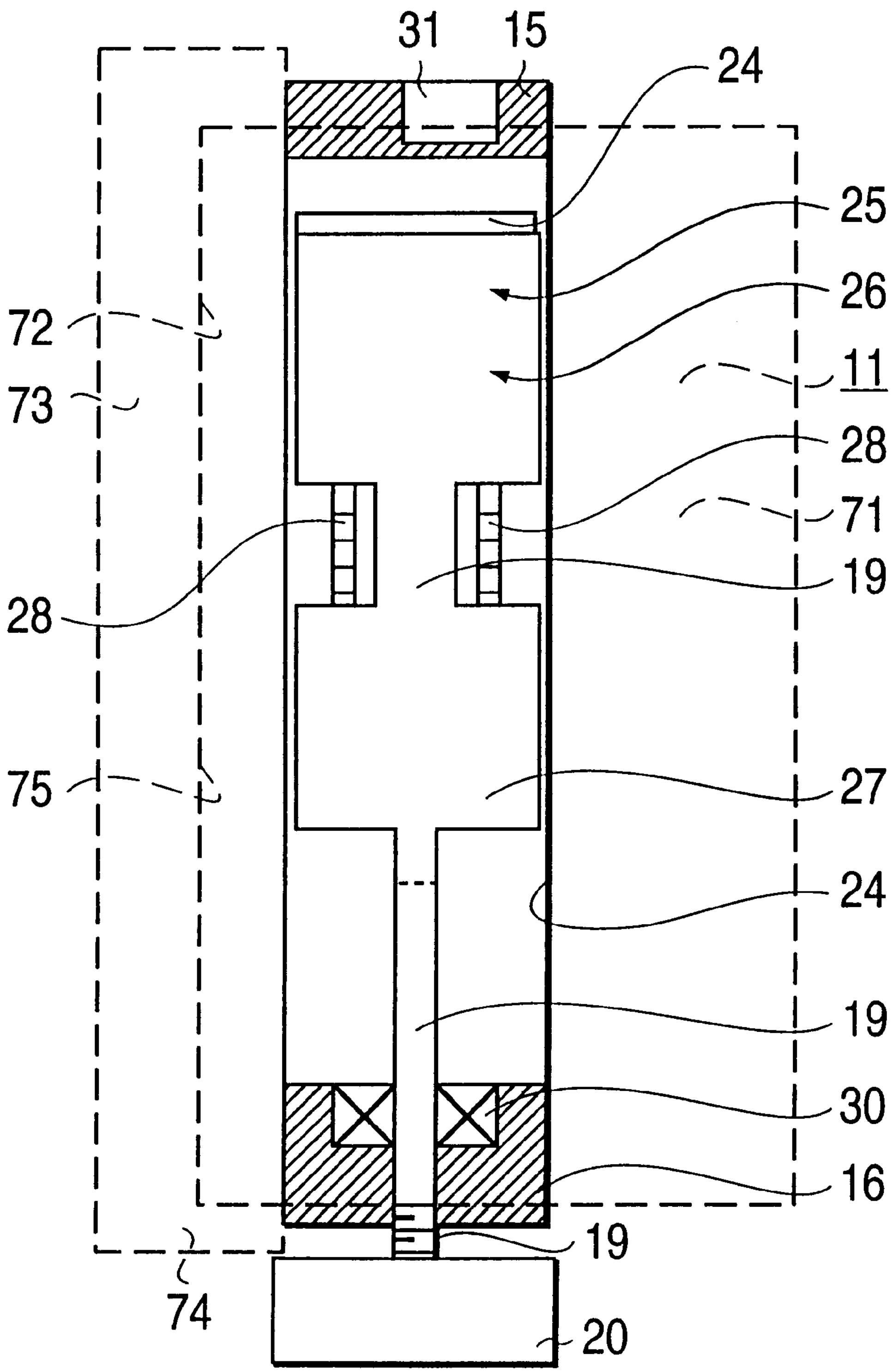
FIG. 7 is a side elevational view of the random selector of a generic embodiment of the invention, with the housing shown in phantom.

(g) Description of FIG. 7

FIG. 7 is essentially similar to FIG. 2 (and includes the reference numbers provided in FIG. 2), but the housing 11 (which is shown in phantom) is shown as a cylindrical housing 71 with one vertical side face sliced off to provide a rectangular face 72. The back plate 73 is now in the form of a rectangular plate with a perimetrical wall 74 and a rectangular valley 75 within the central area thereof.

OPERATION OF THE INVENTION

In use, the spinning dial is rotated either manually, or by a mechanical spring motor (not shown) or by a small electric motor (not shown). This causes the upper cylinder to spin in free-wheeling fashion. The spring-biassed clip alternately engages and disengages the rods as they spin by, thereby slowing down and ultimately stopping the upper cylinder, with only one “H” or only one “T” clearly in view through the viewing window.

CONCLUSION

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and “intended” to be, within the full range of equivalence of the following claims.

I claim:

1. A random character selector comprising:

a housing;

a window in said housing;

a spinnable cylinder mounted within said housing, said spinnable cylinder being spinnable about a vertical axis of said housing;

a plurality of character indicia on an upper circular face of said spinnable cylinder, the upper circular face of the cylinder intersecting said vertical axis of the housing;

an activation mechanism which is operatively associated with said spinnable cylinder;

operator means which is operatively associated with said activation mechanism to spin said spinnable cylinder in a free-wheeling manner; and means for stopping said spinnable cylinder by means of a friction stop mechanism, thereby to display a single randomly-selected character through said window of said housing.

2. The random character selector as claimed in claim 1, wherein the spinnable cylinder is completely contained within the housing.

3. A random character selector comprising:

a cylindrical housing in which a portion of a rear curved portion is sliced away to provide a generally-rectangular rear face;

a window in said cylindrical housing;

a spinnable cylinder which is mounted within the housing and which is mounted for spinning about the longitudinal axis of said cylindrical housing;

a plurality of character indicia on an upper circular face of said spinnable cylinder, the upper circular face of the cylinder intersecting the longitudinal axis of the housing;

an activation mechanism which is operatively associated with said spinnable cylinder;

an operator which is operatively-associated with said activation mechanism to spin said spinnable cylinder in a free-wheeling manner; and a device for stopping said spinnable cylinder by means of a friction stop mechanism to display a single randomly-selected character through said window of said housing.

4. The random character selector as claimed in claim 3, wherein the spinnable cylinder is completely contained within the housing.

5. A random character selector comprising:

a housing in the form of a globular member in which a portion of an upper end has been sliced away to provide an upper circular face, a portion of a lower end has been sliced away to provide a lower circular face, and in which a portion of the rear face has been sliced off to provide a circular rear face;

a window in said upper face of said housing;

a spinnable cylinder which is mounted for spinning about an axis which is perpendicular to a plane of an equator of said globular housing, the upper circular face of the cylinder intersecting the axis, said spinnable cylinder including a plurality of stop members, said stop members being disposed around a circumference of said spinnable cylinder;

a plurality of character indicia on said upper face of said spinnable cylinder;

an activation mechanism which is operatively associated with said spinnable cylinder;

an operator which protrudes from the lower face of said globular housing for operating said activation mechanism to spin said spinnable cylinder in a free-wheeling manner;

a stopping device which is mounted within said globular housing for selective engagement with said stop members to stop said spinnable cylinder, said stopping device being spring biased to an at-rest position and being operated automatically, and alternately, to engage and to disengage said stop members to stop the spinning of the spinnable cylinder, thereby to display a randomly-selected character through said window of said housing.

6. The random character selector as claimed in claim 5, wherein said plurality of character indicia is in the form of alternating “heads” indicia and “tails” indicia, thereby to display a randomly-selected “heads” indicia or “tails” indicia character through the window of the housing.

7. The random character selector as claimed in claim 5, wherein said stop members comprise four vertically-extended teeth on said spinnable cylinder, and wherein said stopping device comprises a pawl which is springingly mounted on a mounting plate which is secured to said circular rear face.

8. The random character selector as claimed in claim 7, wherein said spinnable cylinder is mounted on a central longitudinal shaft, and wherein said operator comprises a manually-operated spinner wheel which is directly connected to said central longitudinal shaft.

9. The random character selector as claimed in claim 7, wherein said spinnable cylinder is mounted on a central longitudinal shaft, and wherein said operator comprises a small electric motor, the output shaft of which is directly connected to said central longitudinal shaft.

10. The random character selector as claimed in claim 7, including a back plate enclosing the circular rear face.

11. The random character selector as claimed in claim 5, wherein the spinnable cylinder is completely contained within the housing.

* * * * *